United States Patent
Khalifa

(10) Patent No.: US 10,955,151 B2
(45) Date of Patent: Mar. 23, 2021

(54) COOLING CHARGE DETERMINATION FOR A LOCAL THERMAL MANAGEMENT SYSTEM

(71) Applicant: H. Ezzat Khalifa, Hilton Head Island, SC (US)

(72) Inventor: H. Ezzat Khalifa, Hilton Head Island, SC (US)

(73) Assignee: SYRACUSE UNIVERSITY, Syracuse, NY (US)

( * ) Notice: Subject to any disclaimer, the term of this patent is extended or adjusted under 35 U.S.C. 154(b) by 0 days.

(21) Appl. No.: 16/582,130

(22) Filed: Sep. 25, 2019

(65) Prior Publication Data

US 2020/0096211 A1     Mar. 26, 2020

Related U.S. Application Data

(60) Provisional application No. 62/735,985, filed on Sep. 25, 2018.

(51) Int. Cl.
*F28F 27/00*       (2006.01)
*F24F 5/00*        (2006.01)
*F24F 1/029*      (2019.01)

(52) U.S. Cl.
CPC ............ *F24F 5/0021* (2013.01); *F24F 1/029* (2019.02); *F24F 2005/0032* (2013.01); *F28F 27/00* (2013.01)

(58) Field of Classification Search
CPC ........ F28F 27/006; F28F 27/00; F24F 5/0021; F24F 2005/0032
USPC ......................................................... 165/236
See application file for complete search history.

(56) References Cited

U.S. PATENT DOCUMENTS

| | | | | |
|---|---|---|---|---|
| 4,104,185 | A * | 8/1978 | Schroder ................ | C09K 5/063 252/70 |
| 6,059,016 | A * | 5/2000 | Rafalovich ........ | B60H 1/00492 165/10 |
| 2007/0298316 | A1* | 12/2007 | Yamamoto .......... | H01M 10/425 429/62 |
| 2009/0169983 | A1* | 7/2009 | Kumar .............. | H01M 10/6552 429/120 |

(Continued)

FOREIGN PATENT DOCUMENTS

EP           3336473 A1 *    6/2018          F28D 20/028

OTHER PUBLICATIONS

Translation of EP-3336473-A1 entitled Translation—EP 3336473 A1 (Year: 2020).*

*Primary Examiner* — Paul Alvare
(74) *Attorney, Agent, or Firm* — Bond Schoeneck & King, PLLC; David Nocilly; George McGuire

(57) ABSTRACT

A system and method for estimating the state of charge, i.e., the amount of cooling remaining, in a latent heat thermal storage module of a local environmental control system. The local environmental control system stores cooling energy at night by freezing a latent heat phase change material (PCM), and then releasing the stored cooling energy by removing heat from room air flowing through the PCM during the day. Differential temperature sensors are used measure the air temperature drop across the latent thermals storage unit and the fan voltage, which is directly related to fan air flow rate, is sampled. A controller is programmed to determine the charging state from these measurements.

8 Claims, 3 Drawing Sheets

(56) References Cited

U.S. PATENT DOCUMENTS

| | | | |
|---|---|---|---|
| 2013/0248166 A1* | 9/2013 | Wang | G05D 23/19 |
| | | | 165/287 |
| 2014/0158340 A1* | 6/2014 | Dixler | F28F 27/00 |
| | | | 165/287 |
| 2016/0252296 A1* | 9/2016 | Ros | F25D 29/005 |
| | | | 702/136 |
| 2018/0097376 A1* | 4/2018 | Renaud-Byrne | H02J 7/0036 |
| 2019/0165396 A1* | 5/2019 | Farnsworth | H01M 8/04731 |

* cited by examiner

COOLING CHARGE DETERMINATION FOR A LOCAL THERMAL MANAGEMENT SYSTEM

CROSS-REFERENCE TO RELATED APPLICATIONS

The present application claims priority to U.S. Provisional Application No. 62/735,985, filed on Sep. 25, 2018.

STATEMENT REGARDING FEDERALLY SPONSORED RESEARCH AND DEVELOPMENT

This invention was made with government support under grant no. DE-AR0000526 awarded by the Department of Energy (DOE). The government has certain rights in the invention.

BACKGROUND OF THE INVENTION

1. Field of the Invention

The present invention relates to local thermal management systems and, more particularly, to a system and method for determining the charging state of a phase change material used in a latent thermal storage unit.

2. Description of the Related Art

A local thermal management system may be employed to cool a person and maintain comfort in a room whose temperature has been raised in the summer to save energy and reduce peak electric demand. One effective method for achieving this is to freeze a latent-heat, phase change material (PCM) at 60-65° F. during the night and use the stored "cooling" in the frozen PCM during the day to cool the person by blowing room air through the frozen PCM to cool it. As the warm room air flows through the frozen PCM it will cause it to melt and release its stored "cooling" to reduce the exiting air temperature. Generally, such a system will include a compressor, a condenser coupled to the compressor, an expansion valve coupled to the condenser, a thermal storage module including an embedded evaporator coupled to the expansion valve and a phase change material surrounding the evaporator, and one or more fans positioned to selectively direct a stream of air through the phase change material or over the condenser. The compressor, condenser, expansion device and evaporator constitute a micro vapor compression system (μVCS). A controller is coupled to the compressor and the fan(s) and is programmed to operate the system in a cooling mode wherein the μVCS is operated to freeze the phase change material during a first predetermined time period, and the fan is operated to direct a stream of room air through the phase change material during a second predetermined time period.

A practical application of a micro environmental control system should be able to determine the amount of latent thermal storage that is available for use on an ongoing basis and, preferably, provide an indication of the cooling charge state of the phase change material to a user. Given that the rate of melting is dependent on the room temperature and the occupant use pattern (e.g., increasing air flow rate, or hours of use), the depletion rate of the stored cooling charge may vary considerably. Accordingly, there is a need for an approach that can monitor variable usage of the latent thermal storage unit of a micro environmental control system, determine the depletion of cooling capabilities, and then provide the user of a system with accurate information about the charge state.

BRIEF SUMMARY OF THE INVENTION

The present invention is a system and method for determining the state of charge of the latent thermal storage unit of a local environmental control system. The present invention may be used to alert the occupant to how much cooling charge is left as well as to determine how much freezing is to be done at night.

In a first embodiment, the present invention comprises a latent thermal storage unit having a predetermined total cooling charge, a fan positioned to direct a flow of air over the latent thermal storage unit and having a power circuit for driving the fan to produce the flow of air, a first temperature sensor positioned upstream of the latent thermal storage unit relative to the flow of air for providing a first temperature of the flow of air, a second temperature sensor positioned downstream of the latent thermal storage unit relative to the flow of air for providing a second temperature of the flow of air, and a programmable device coupled to the power circuit of the fan, the first temperature sensor, and the second temperature sensor, wherein the programmable device is programmed to determine an amount of cooling charge remaining in the latent thermal storage unit. The programmable device is programmed to determine the amount of consumed cooling charge based on an amount of input voltage to the fan and the readings of the two temperature sensors. The programmable device is programmed to determine the amount of fan flow rate that is calculated from the amount of input voltage to the fan. The programmable device is programmed to determine the amount of cooling charge remaining based on the fan flow rate and the measured input and exit air temperatures over time. The programmable device is programmed to determine the amount of cooling charge remaining based on the predetermined total cooling charge less an amount of cooling charge used. The amount of cooling charge used is calculated from the fan flow rate over time and a temperature differential across the latent thermal storage unit as determined from the first temperature sensor and the second temperature sensor. The fan flow rate is recorded over time according to a predetermined schedule. The predetermined schedule is every thirty minutes from when the fan is first powered by the power circuit. The system may further comprise a display interconnected to the programmable device, wherein the programmable device is programmed to display the amount of cooling charge remaining on the display.

In another embodiment, the present invention is a method of monitoring a local environmental control system. In a first step, the method comprises providing a cooling device having a latent thermal storage unit with a predetermined total cooling charge, a fan that is powered by a power circuit to direct a flow of air over the latent thermal storage unit, first and second temperature sensors providing first and second temperatures upstream and downstream of the latent thermal storage unit, respectively, and a programmable device coupled to the power circuit and the first and second temperature sensors. In another step, the method comprises using the programmable device to determine an amount of cooling charge remaining in the latent thermal storage unit. The method may also comprise displaying the amount of cooling charge remaining on a display.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
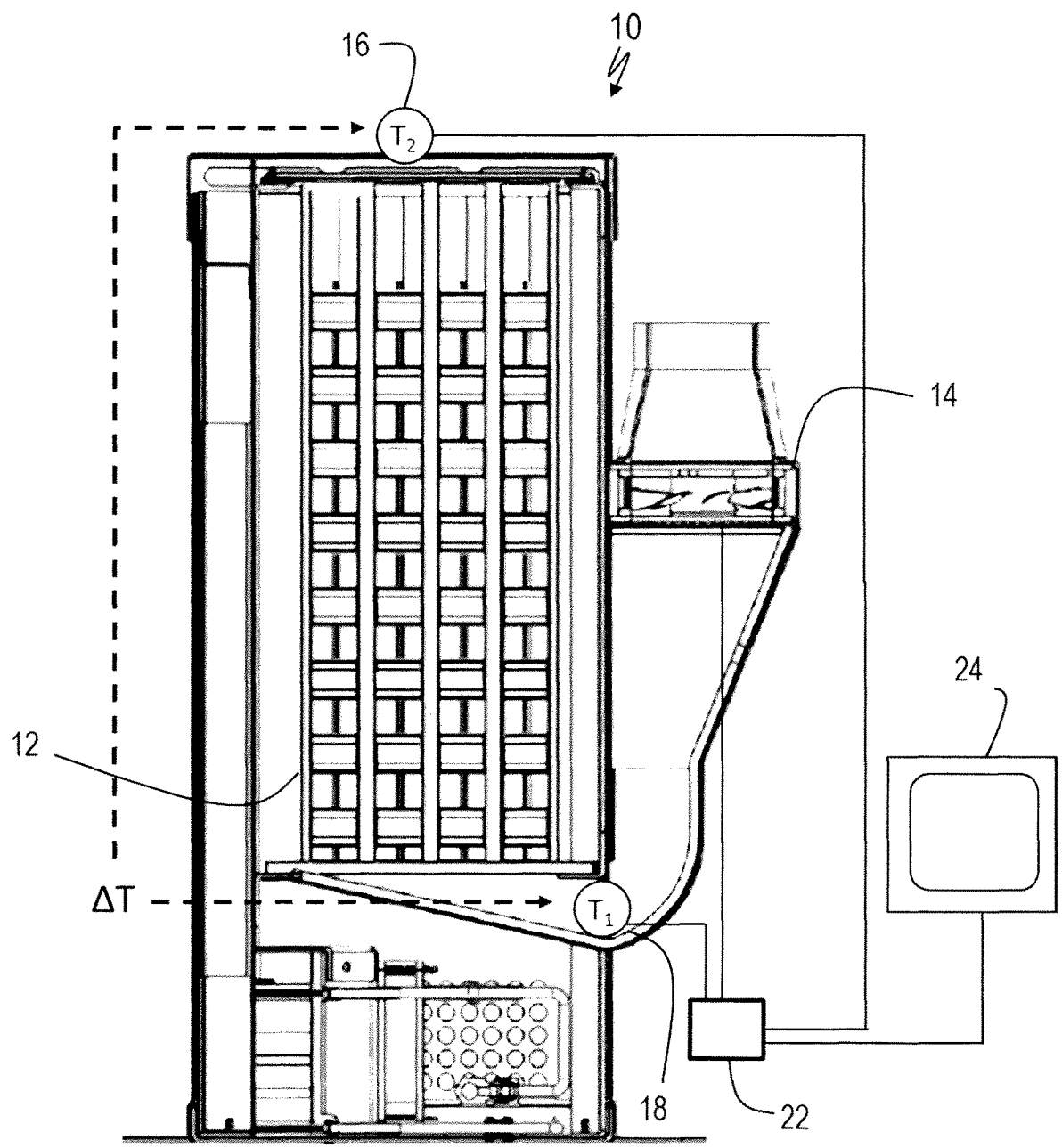
FIG. 1 is a schematic of a local environmental control system having a cooling charge determination system according to the present invention.
Figure 2:
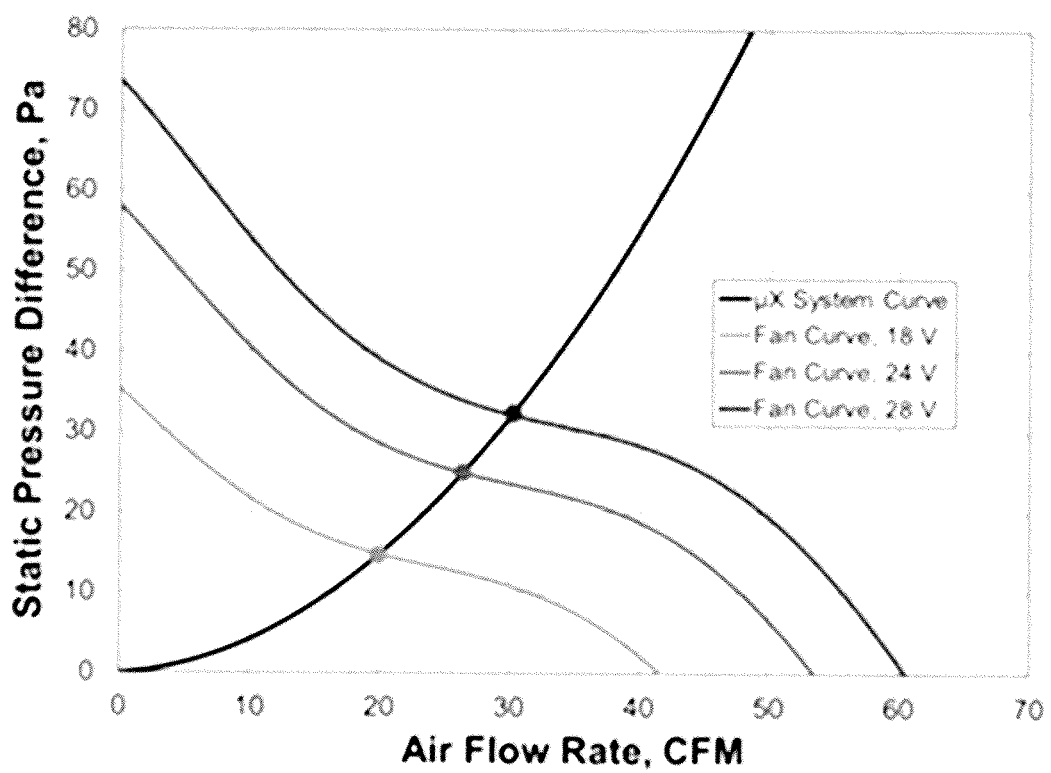
FIG. 2 is a graph of air flow rate versus state pressure difference for a local environmental control system according to the present invention.
Figure 3:
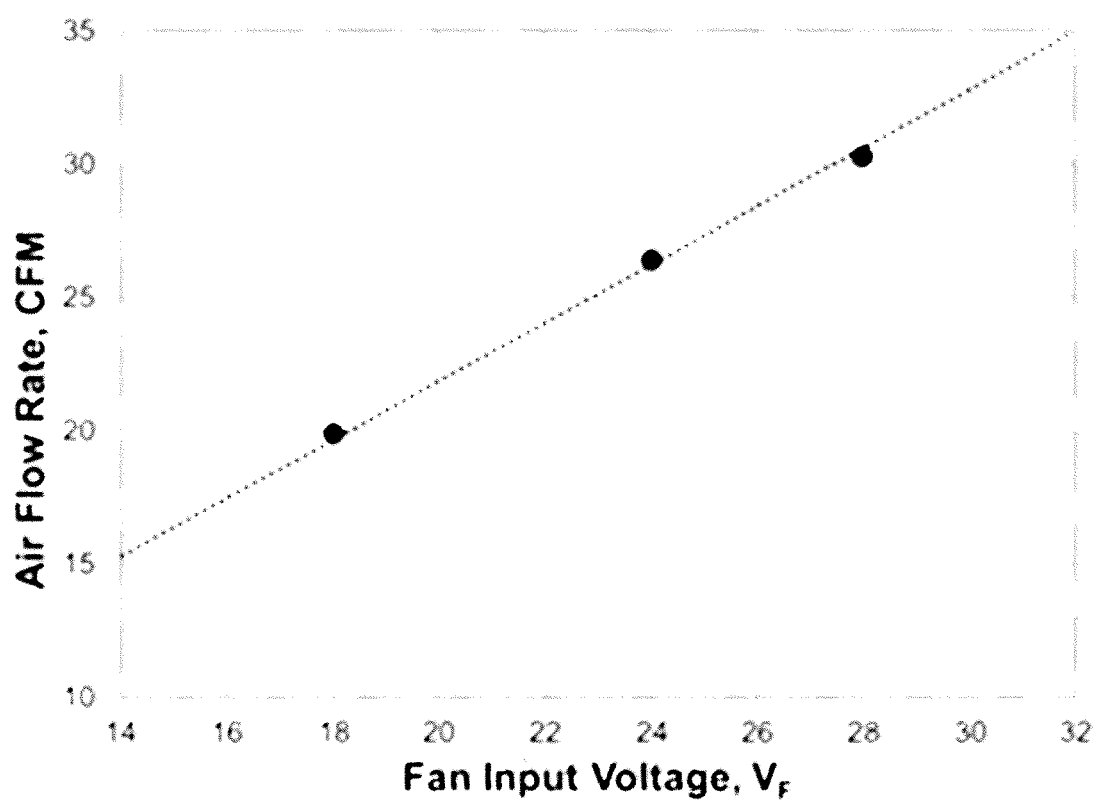
FIG. 3 is graph of fan input voltage versus air flow rate for a local environmental control system according to the present invention.

Referring now to the drawings, wherein like reference numerals refer to like parts throughout, there is seen in FIG. 1 a local environmental control system 10 that control the temperature in the near range personal microenvironment that is equipped with a system and method for determining the state of charge of the latent thermal storage unit 12 of a local environmental control system. The present invention measures the temperature differential between the air entering and leaving the thermal storage (using differential thermocouples or thermistors) as well as the speed of the air moving fan, which can be inferred from the fan driving voltage. From this data, the cooling state of the latent thermal storage unit may be determined and displayed for a user.

System 10 generally includes a fan 14 for directing air over the latent thermal storage unit 12 during cooling operations. A pair of temperature sensors 16 and 18 are positioned upstream and downstream of latent thermal storage unit 12 to measure the temperature of air driven by fan 14 prior to and after the air has been exposed to latent thermal storage unit 12 and, if a charge is remaining, cooled by latent thermal storage unit 12. A programmable device 22, such as microprocessor or microcontroller, is coupled to the circuitry of fan 14 and is programmed to receive the outputs from pair of temperature sensors 16 and 18, and calculate the amount of cooling charge remaining, as described in detail below. Programmable device 22 may additionally comprise a smart phone or computer interconnected to pair of temperature sensors 16 and 18, such as by a wireless connection (e.g., 802.11 network or Bluetooth® protocol) that is programmed with an application to perform the cooling charge calculation.

Measurement of the air temperature drop ($\Delta T$) across latent thermal storage unit 12 and the fan input voltage (V) every half-hour (or any predefined time period) during melting may be used by device 22 to calculate the amount of cooling energy remaining. For example, starting with a fully charged PCM module, $\Delta T$ and $V_F$ may be recorded after 30 minutes of start and every hour after that. As the fan flow rate for the type of brushless DC (BLDC) fan motor used in system 10 changes linearly with the input voltage, the input voltage to fan 14 may be sampled by device 22 and used to calculate the air flow rate. Device is further programmed to calculate the amount of energy transferred from latent thermal storage unit 12 based on the air flow rate of fan 14 to latent thermal storage unit 12 and temperature differential across latent thermal storage unit 12 as measured by temperature sensors 16 and 18. As a result, the amount of stored cooling that has been consumed can be estimated and subtracted from the total cooling power of latent thermal storage unit 12 to determine the amount of cooling charge remaining.

The calculations required to estimate the amount of the stored cooling that have been used, and thus the state of the remaining charge are presented by the set of equations below. This approach assumes that the PCM will be frozen to full capacity prior art to use.

$$Q^*(t_k) = Q_o - Q(t_k).$$

$$Q(t_k) = \sum_{i=1}^{k} \dot{Q}(t_i) \cdot \delta t, \text{ where } \delta t = 1 \text{ h.}$$

$$\dot{Q}(t_i) = (c_p \rho)_{air} \dot{V}(t_i) \Delta T(t_i).$$

$$\Delta T(t_i) = \alpha \Delta V_T(t_i),$$

where $\Delta V_T$ is the TC's measured differential voltage.

$$\dot{V}(t_i) = \beta V_F(t_i),$$

where $V_F$ is the fan's measured input voltage.

Q* in the above equations represents the state of charge (how much is remaining), $c_p$ is the known specific heat of air, $\rho$ is the known density of air, $\dot{V}$ is the air volume flow rate, V is the fan driving voltage, $\Delta T$ is the air temperature drop and t is time. It should be recognized that device 22 may be programmed to sample the appropriate sensors and perform these calculations as needed or on a predetermined schedule. As is known in the field, device 22 may be interconnected to a display 24 or screen to provide such information to a user. In addition, device 22 may communicate the determined charging state to a remote host, such as a connected smart device or a central system in a building that is tasked with monitoring multiple local environmental control systems 10. Alternatively, programmable device 22 may comprise a smart device in communication with fan 14 and temperature sensors 16 and 18 and include an application configured to perform the cooling charge calculations.

As described above, the present invention may be a system, a method, and/or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each element of the controller can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part or all of any of the blocks in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. A system for determining remaining cooling charge, comprising:
   a latent thermal storage unit having a predetermined total cooling charge;
   a fan positioned to direct a flow of air over the latent thermal storage unit and having a power circuit for driving the fan to produce the flow of air;
   a first temperature sensor positioned upstream of the latent thermal storage unit relative to the flow of air for providing a first temperature of the flow of air;
   a second temperature sensor positioned downstream of the latent thermal storage unit relative to the flow of air for providing a second temperature of the flow of air; and
   a programmable device coupled to the power circuit of the fan, the first temperature sensor, and the second temperature sensor, wherein the programmable device is programmed to determine an amount of cooling charge remaining in the latent thermal storage unit;
   wherein the programmable device is programmed to determine the amount of cooling charge remaining based on a predetermined total cooling charge less an amount of cooling charge used;
   wherein the amount of cooling charge used is calculated from a fan flow rate over time and a temperature differential across the latent thermal storage unit as determined from the first temperature sensor and the second temperature sensor; and
   wherein the fan flow rate is calculated from an amount of input voltage to the fan.

2. The system of claim 1, wherein the fan flow rate is recorded over time according to a predetermined schedule.

3. The system of claim 2, wherein the predetermined schedule is every thirty minutes from when the fan is first powered by the power circuit.

4. The system of claim 3, further comprising a display interconnected to the programmable device, wherein the programmable device is programmed to display the amount of cooling charge remaining on the display.

5. A method of monitoring a local environmental control system, comprising the steps of:
   providing a cooling device having a latent thermal storage unit with a predetermined total cooling charge, a fan that is powered by a power circuit to direct a flow of air over the latent thermal storage unit, first and second temperature sensors providing first and second temperatures upstream and downstream of the latent thermal storage unit, respectively, and a programmable device coupled to the power circuit and the first and second temperature sensors; and
   using the programmable device to calculate to determine an amount of cooling charge remaining in the latent thermal storage unit;
   wherein the programmable device is programmed to determine the amount of cooling charge remaining based on a predetermined total cooling charge less an amount of cooling charge used;
   wherein the amount of cooling charge used is calculated from a fan flow rate over time and a temperature differential across the latent thermal storage unit as determined from the first temperature sensor and the second temperature sensor; and
   wherein the fan flow rate is calculated from an amount of input voltage to the fan.

6. The method of claim 5, wherein the programmable device records the fan flow rate over time according to a predetermined schedule.

7. The method of claim 6, wherein the predetermined schedule is every thirty minutes from when the fan is first powered by the power circuit.

8. The method of claim 5, wherein the cooling device includes a display interconnected to the programmable device and the programmable device displays the amount of cooling charge remaining.

* * * * *